(12) United States Patent
Lee et al.

(10) Patent No.: US 12,537,235 B2
(45) Date of Patent: Jan. 27, 2026

(54) FLEXIBLE PRINTED CIRCUIT BOARD FOR MEASURING INTERNAL PRESSURE OF POUCH CELL, AND METHOD OF MEASURING INTERNAL PRESSURE OF POUCH CELL

(71) Applicant: LG Energy Solution, Ltd., Seoul (KR)

(72) Inventors: Ki-Young Lee, Daejeon (KR); Dong-Wan Ko, Daejeon (KR); Do-Yul Kim, Daejeon (KR); Ju-Ri Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 489 days.

(21) Appl. No.: 18/017,790

(22) PCT Filed: Dec. 14, 2021

(86) PCT No.: PCT/KR2021/019009
§ 371 (c)(1),
(2) Date: Jan. 24, 2023

(87) PCT Pub. No.: WO2022/145816
PCT Pub. Date: Jul. 7, 2022

(65) Prior Publication Data
US 2023/0291017 A1    Sep. 14, 2023

(30) Foreign Application Priority Data

Dec. 28, 2020 (KR) .................. 10-2020-0184945

(51) Int. Cl.
*H01M 10/42* (2006.01)
*H01M 10/48* (2006.01)
(Continued)

(52) U.S. Cl.
CPC ..... *H01M 10/4285* (2013.01); *H01M 10/425* (2013.01); *H01M 10/48* (2013.01);
(Continued)

(58) Field of Classification Search
None
See application file for complete search history.

(56) References Cited

U.S. PATENT DOCUMENTS

| 9,631,997 | B2 | 4/2017 | Elian |
| 2012/0299555 | A1 | 11/2012 | Tam et al. |

(Continued)

FOREIGN PATENT DOCUMENTS

| CN | 105264689 A | 1/2016 |
| CN | 107112549 A | 8/2017 |

(Continued)

OTHER PUBLICATIONS

Extended European Search Report including Written Opinion for Application No. 21915614.8 dated Sep. 19, 2024. 6 pgs.

(Continued)

*Primary Examiner* — Jonathan Crepeau
(74) *Attorney, Agent, or Firm* — Lerner David LLP

(57) ABSTRACT

A flexible printed circuit board for pouch cell internal pressure measurement includes a sensing part on which a pressure sensor is mounted; a board part provided with connector pins connected to a plurality of conductor lines, respectively; and an extension part extending from the sensing part to the board part. The extension part includes a protective sheath of a metal material that surrounds an outer surface of an insulating film in a predetermined section.

13 Claims, 6 Drawing Sheets

(51) Int. Cl.
  *H01M 50/105* (2021.01)
  *H01M 50/178* (2021.01)
  *H05K 1/11* (2006.01)
  *H05K 1/18* (2006.01)

(52) U.S. Cl.
  CPC ....... *H01M 10/486* (2013.01); *H01M 50/178* (2021.01); *H05K 1/189* (2013.01); *H01M 50/105* (2021.01); *H05K 1/118* (2013.01); *H05K 1/181* (2013.01)

(56) References Cited

U.S. PATENT DOCUMENTS

| | | | |
|---|---|---|---|
| 2014/0312911 A1 | 10/2014 | Ding | |
| 2014/0342203 A1 | 11/2014 | Elian | |
| 2015/0132621 A1 | 5/2015 | Henrici et al. | |
| 2015/0333360 A1* | 11/2015 | Tajima | H01M 50/463 429/127 |
| 2016/0218533 A1 | 7/2016 | Lim et al. | |
| 2017/0018816 A1* | 1/2017 | Na | H01M 10/0565 |
| 2017/0324120 A1 | 11/2017 | Pantel et al. | |
| 2020/0358145 A1 | 11/2020 | Sauerteig et al. | |

FOREIGN PATENT DOCUMENTS

| | | |
|---|---|---|
| CN | 207559000 U | 6/2018 |
| DE | 102012207999 A1 | 11/2013 |
| JP | 2000340264 A | 12/2000 |
| JP | 2002313431 A | 10/2002 |
| JP | 2010244844 A | 10/2010 |
| JP | 5914694 B2 | 5/2016 |
| JP | 201878067 A | 5/2018 |
| KR | 20080029555 A | 4/2008 |
| KR | 20170112490 A | 10/2017 |
| KR | 101923091 B1 | 11/2018 |
| WO | 2018075410 A1 | 4/2018 |
| WO | WO 2019/146960 * | 8/2019 |

OTHER PUBLICATIONS

International Search Report for Application No. PCT/KR2021/019009 mailed Mar. 28, 2022, pp. 1-3.

* cited by examiner

FLEXIBLE PRINTED CIRCUIT BOARD FOR MEASURING INTERNAL PRESSURE OF POUCH CELL, AND METHOD OF MEASURING INTERNAL PRESSURE OF POUCH CELL

CROSS REFERENCE TO RELATED APPLICATIONS

The present application is a national phase entry under 35 U.S.C. § 371 of International Application No. PCT/KR2021/019009 filed Dec. 14, 2021 which claims priority to Korean Patent Application No. 10-2020-0184945 filed on Dec. 28, 2020 in the Republic of Korea, the disclosures of which are incorporated herein by reference.

TECHNICAL FIELD

The present disclosure relates to an apparatus for measuring the internal pressure of a pouch cell, and a method of measuring the internal pressure of a pouch cell by using the apparatus.

BACKGROUND ART

Recently, interest in energy storage technology is increasing. Research and development of electrochemical devices are becoming active as the field of application expands to mobile phones, camcorders, and laptops, and even the energy of electric vehicles. Electrochemical devices are a field receiving the most attention in this aspect, and among them, the development of rechargeable batteries capable of charging and discharging is the focus of interest.

Among current secondary batteries, lithium secondary batteries developed in the early 1990s are in the spotlight because of their high operating voltage and high energy density compared to conventional batteries such as Ni-MH.

One of the main research tasks of lithium secondary batteries is to improve the safety of lithium secondary batteries. Lithium secondary batteries have several problems that threaten the safety of secondary batteries, such as internal short circuit due to external impact, heat generation due to overcharging and over discharging, electrolyte decomposition due to heat generation, and thermal runaway.

In particular, explosion of secondary batteries originates from various causes, but an increase in a gas pressure inside secondary batteries due to electrolyte decomposition is also one of the causes. In detail, when a secondary battery is repeatedly charged and discharged, gas is generated through an electrochemical reaction between an electrolyte and an electrode active material. The generated gas raises an internal pressure of the secondary battery, causing problems such as weakening of fastening between component parts, damage to an external battery case of the secondary battery, an early operation of a protection circuit, deformation of an electrode, internal short circuit, and explosion.

In order to address such safety problems of secondary batteries, there is a need to manufacture an external battery case capable of obtaining pressure data by accurately measuring a change in an internal pressure of a secondary battery during charging and discharging and capable of designing a charging and discharging algorithm of a BMS protection circuit or sufficiently enduring a maximum internal pressure, by reflecting the pressure data.

In order to accurately measure a change in the internal pressure of a secondary battery cell, it is good to insert a pressure sensor into the secondary battery cell. However, in particular, in the case of pouch cells, it is difficult to insert a pressure sensor into a pouch outer casing, and there is no other proper methods. Thus, it is not possible to accurately grasp how the internal pressure of the pouch cell changes during charging and discharging. Then, the present applicant has recently attempted a method of mounting a pressure sensor on one end of a flexible printed circuit board capable of three-dimensional (3D) wiring and having a very small thickness, and inserting a resultant structure into a pouch cell to measure an internal pressure of the pouch cell. However, it is difficult to insert one end of the flexible printed circuit board into the pouch cell and seal a pouch outer casing of the pouch cell.

For example, a pouch outer casing 1 is usually composed of two pouch sheets, and respective edges of the two pouch sheets are heat-welded and sealed. At this time, a polyimide film is peeled off from an outer surface of a flexible printed circuit board 2 so that the flexible printed circuit board 2 may be well adhered between the two pouch sheets. However, as shown in FIG. 1, during heat-welding, the flexible printed circuit board 2 is cut or conductor patterns in the cut portion are damaged, and thus communication is paused.

SUMMARY

Technical Problem

The present disclosure is designed to solve the problems of the related art, and therefore the present disclosure is directed to providing a flexible printed circuit board for pouch cell internal pressure measurement capable of inserting a pressure sensor into a pouch cell and measuring the internal pressure of the pouch cell without functional problems, and a pouch cell internal pressure measurement method using the flexible printed circuit board.

The technical problems to be solved in the present disclosure are not limited to the above, and other problems that are not mentioned could be clearly understood by one of ordinary skill in the art from the description of the present disclosure below.

Technical Solution

In one aspect of the present disclosure, there is provided a flexible printed circuit board for pouch cell internal pressure measurement including a plurality of conductor lines, an insulating film having insulation properties and flexibility, which surround the plurality of conductor lines, a sensing part on which a pressure sensor is mounted; a board part having connector pins connected to a plurality of conductor lines, respectively; and an extension part extending from the sensing part to the board part, wherein the extension part includes a protective sheath of a metal material that surrounds an outer surface of an insulating film in a predetermined section.

The protective sheath may be a gold or copper plating film.

The sensing part may have a width equal to or smaller than a width of a gas pocket portion formed in a pouch cell that is an internal pressure measurement target, and the protective sheath may be formed to extend with a length equal to or greater than a width of a sealing portion formed in the pouch cell.

The sensing part may be parylene coated.

An underfill or a conformal coating is added to a portion of the sensing part where the pressure sensor and the plurality of conductor lines are soldered.

The pressure sensor may be a waterproof micro electromechanical system (MEMS) pressure sensor.

The sensing part may further include a temperature sensor.

The sensing part may be provided in plurality and the board part may be provided in singularity.

In one aspect of the present disclosure, there is provided a method of measuring the internal pressure of a pouch cell by using a flexible printed circuit board including at least one sensing part for pouch cell internal pressure measurement, the pouch cell including a pouch outer casing including an upper pouch sheet and a lower pouch sheet covering the upper and lower sides of an electrode assembly, respectively, the method including sealing the pouch outer casing by thermally welding a protective sheath together with the upper pouch sheet and the lower pouch sheet with the at least one sensing part disposed in a gas pocket portion inside the pouch cell; and measuring the internal pressure of the pouch cell by connecting a data analysis device to a board part and measuring the internal pressure of the pouch cell while repeatingly charging and discharging the pouch cell.

before disposing the sensing part in the gas pocket portion, sealing partially the pouch cell by heat-sealing the edges of the upper pouch sheet and the lower pouch sheet to and leaving an unsealed section so that the at least one sensing part can be inserted, and, after the at least one sensing part is inserted into the pouch outer casing through the unsealed section, sealing the pouch outer casing by heat-welding the unsealed section.

The upper pouch sheet, the protective sheath, and the lower pouch sheet may be integrally heat-welded with one another by using a heat-pressing jig having a groove corresponding to a shape of the protective sheath of an extension part when heat-welding the unsealed section.

The method further includes, when the at least one sensing part includes a first sensing part and a second sensing part, disposing the first y sensing part in the gas pocket portion on a side of the pouch cell where a positive electrode lead is located, and disposing the second sensing part in the gas pocket portion on a side of the pouch cell where a negative electrode lead is located.

Advantageous Effects

According to the present disclosure, provided are a flexible printed circuit board for pouch cell internal pressure measurement capable of inserting a pressure sensor into a pouch cell and measuring the internal pressure of the pouch cell without functional problems, and a pouch cell internal pressure measurement method using the flexible printed circuit board.

The effects of the present disclosure are not limited to the aforementioned effects, and effects not mentioned will be clearly understood by those of ordinary skill in the art to which the present disclosure belongs from the present specification and the accompanying drawings.

DETAILED DESCRIPTION

Embodiments of the present disclosure will now be described in detail with reference to the accompanying drawings. Terms or words used in the present specification and claims should not be interpreted as being limited to typical or dictionary meanings, but should be interpreted as having meanings and concepts, which comply with the technical aspects of the present invention, based on the principle that an inventor can appropriately define the concept of the term to describe his/her own invention in the best manner.

Therefore, configurations illustrated in the embodiments and the drawings described in the present specification are only preferred embodiment of the present disclosure and do not represent all of the technical aspects of the present disclosure, and thus it is to be understood that various equivalents and modified examples, which may replace the configurations, are possible when filing the present application.

Figure 1:
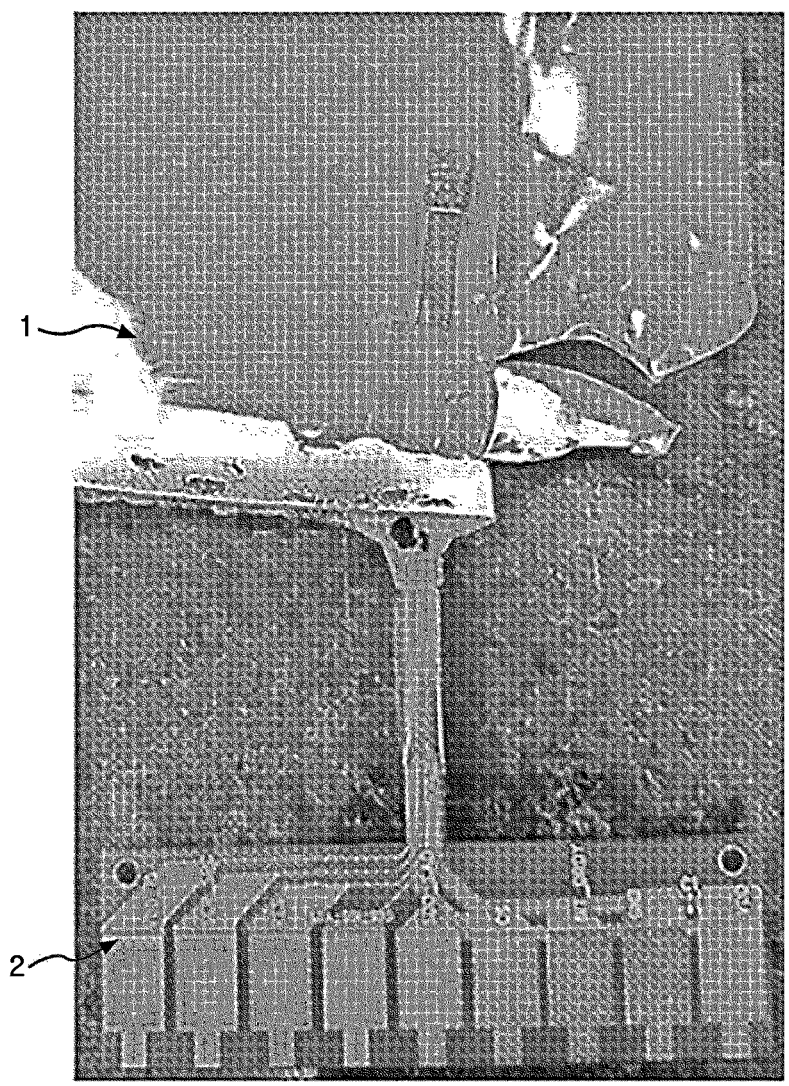
FIG. 1 is a picture showing a flexible printed circuit board cut while a conventional pouch outer casing is being sealed.
Figure 2:
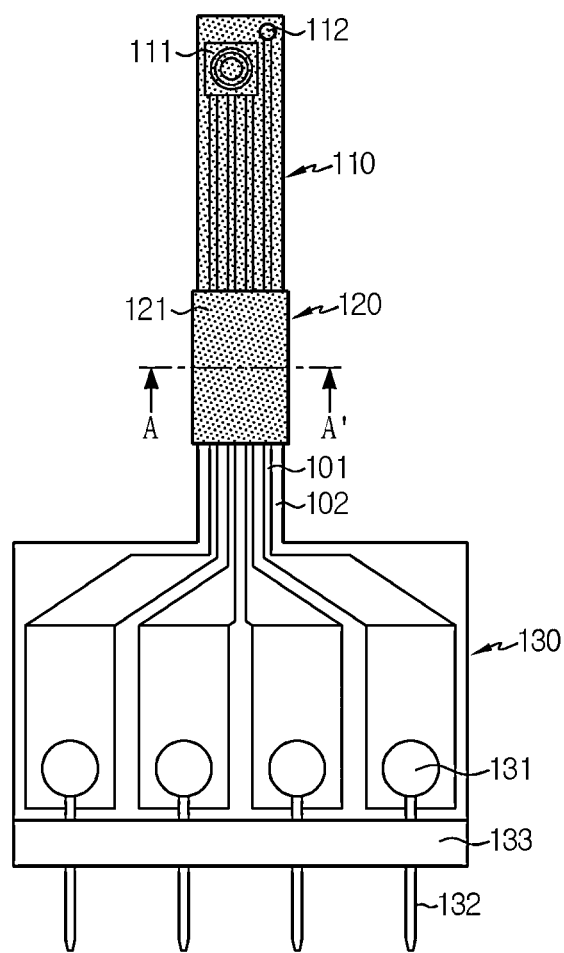
FIG. 2 is a diagram of a flexible printed circuit board for pouch cell internal pressure measurement, according to an embodiment of the present disclosure.
Figure 3:
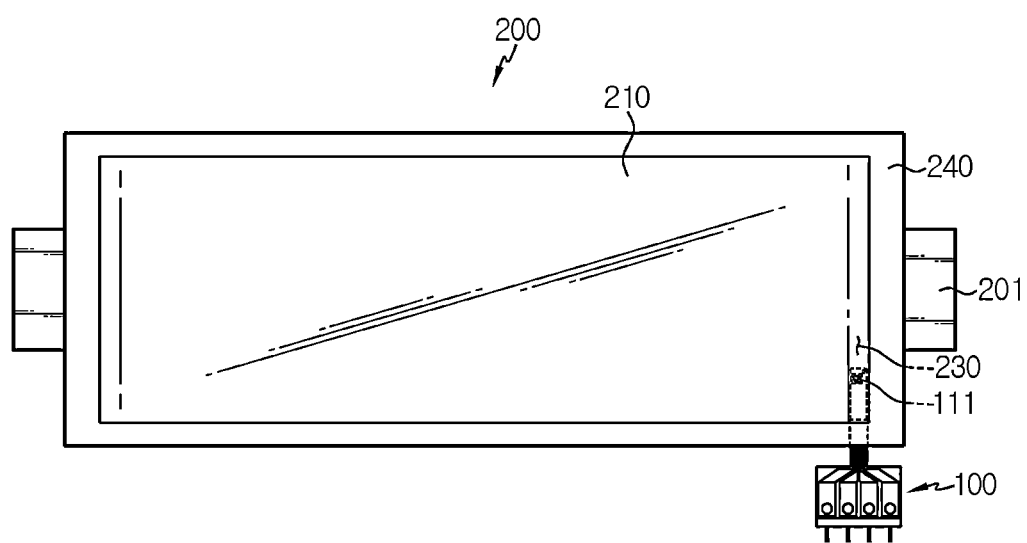
FIG. 3 is a diagram of an example in which the flexible printed circuit board according to an embodiment of the present disclosure is provided in a pouch cell.
Figure 4:
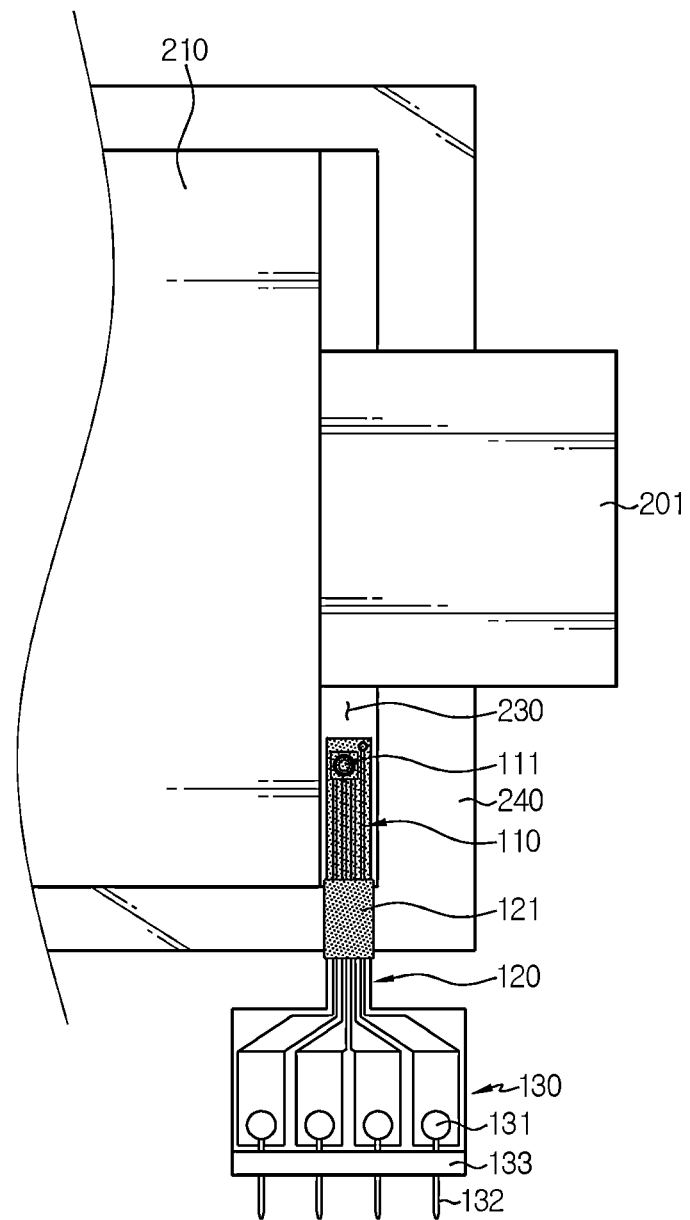
FIG. 4 is a schematic diagram of the inside of a pouch cell in which a pressure sensor of the flexible printed circuit board of FIG. 3 is located.

FIG. 2 is a diagram of a flexible printed circuit board for pouch cell internal pressure measurement according to an embodiment of the present disclosure, FIG. 3 is a diagram of an example in which the flexible printed circuit board according to an embodiment of the present disclosure is installed in a pouch cell, and FIG. 4 is a schematic diagram of the inside of the pouch cell in which a pressure sensor of the flexible printed circuit board of FIG. 3 is located.

In the flexible printed circuit board 100 according to an embodiment of the present disclosure, insulation and coating may be achieved in a way of disposing a copper clad laminate on a base film 102a, laminating a dry film on a resultant structure, and performing exposure, development, and etching to form conductor lines 101 having a predetermined interval therebetween, and then bonding a coverlay film 102b to the conductor lines 101.

The conductor lines 101 may be formed of a metal having excellent electrical conductivity, such as copper (Cu) or silver (Ag), and an insulating film 102 may be formed of an insulating material such as polyethylene terephthalate or polyamide and may include the base film 102a and the coverlay film 102b.

Because the flexible printed circuit board 100 is capable of processing a large number of signals and loads with a minimum volume, has insulation properties and flexibility, and is very thin, a pressure sensor 111 may be mounted on one end of the flexible printed circuit board 100 and put into a pouch cell 200, and may be used to measure the internal pressure of the pouch cell 200.

Referring to FIG. 2, the flexible printed circuit board 100 for measuring the internal pressure of the pouch cell 200, according to an embodiment of the present disclosure, includes a sensing part 110, an extension part 120, and a board part 130.

Referring to FIGS. 3 and 4, the sensing part 110 is a portion that enters the pouch cell 200, which is an internal pressure measurement target, and is manufactured to have a width and a length enabling disposition in a gas pocket portion 230 formed in the pouch cell 200. In particular, the sensing part 110 is manufactured to have a width equal to or smaller than a width of the gas pocket portion 230. The pressure sensor 111 may be mounted on an end portion of the sensing part 110. In addition to the pressure sensor 111, a temperature sensor 112 or a gas sensor (not shown) may be mounted on the sensing part 110 to simultaneously collect data such as a temperature and gas as well as the internal pressure of the pouch cell 200.

The entire sensing part 110 may be parylene coated. The parylene coating refers to a polymer coating deposited on a subject in a nanometer (nm) or micrometer (um) thickness unit regardless of shape in a gaseous form in a vacuum at room temperature. When such a parylene coating is applied, a thin and transparent polymer film is formed on the entire surface of the sensing part 110. In this case, even when the sensing part 110 is placed inside the pouch cell 200, corrosion of or damage to the sensing part 110 due to an electrolyte may be prevented.

In addition, underfill or conformal coating may be additionally applied to a soldering portion of the sensing part where the pressure sensor and the conductor lines are connected to each other, to thereby reinforce a tolerance of the place where the pressure sensor is mounted to physical and chemical shocks.

The underfill refers to a method of filling the underside of a package such as a chip with an insulating resin, and the conformal coating is a work of keeping the lifespan of components and circuit devices longer from external environments and physical influences by forming a very thin film on a printed circuit board (PCB) or various electrical boards by using a coating material.

A waterproof micro electro-mechanical system (MEMS) pressure sensor 111 may be employed as the pressure sensor 111.

Figure 5:
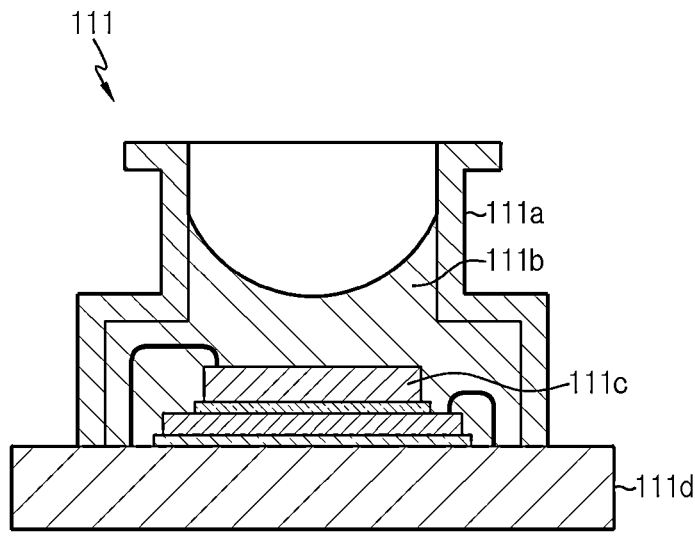
FIG. 5 is a schematic diagram of a pressure sensor of FIG. 4.

As shown in FIG. 5, the waterproof MEMS pressure sensor 111 may have a structure in which a sensor chip 111c is located inside a cylindrical lid 111a filled with a viscous gel 111b and a PCB 111d connected to the sensor chip 111c covers a lower end portion of the cylindrical lid 111a. Compared to general MEMS pressure sensors that directly contact an external fluid (non-corrosive gas) to measure pressure, the waterproof MEMS pressure sensor 111 applied to the present embodiment may directly measure the pressures of liquid and various types of gases because the viscous gel 111b is filled in the cylindrical lid 111a, and may withstand an electrolyte and have excellent waterproof performance.

The extension part 120 is a portion extending from the sensing part 110 to the board part 130, and a portion of the extension part 120 may be heat-welded to a sealing portion 240 of the pouch cell 200.

A pouch outer casing 220 may include an upper pouch sheet 221 and a lower pouch sheet 222 each including an external insulation layer, a metal layer, and an internal adhesion layer, and covering upper and lower sides of an electrode assembly 210, respectively. When the pouch outer casing 220 is sealed, respective edges of the upper pouch sheet 221 and the lower pouch sheet 222 are typically heat-welded to each other. In this case, an edge portion of the upper pouch sheet 221 and the lower pouch sheet 222 resulting from the heat welding is referred to as the sealing portion 240 or a terrace.

The electrode assembly 210 is an assembly of electrode plates and a separator, and may be configured such that one or more positive electrode plates and one or more negative electrode plates are disposed with a separator interposed therebetween. An electrode tab may be included in each electrode plate of the electrode assembly 210 and may be connected to an electrode lead. In the pouch cell 200, a positive electrode lead 201 and a negative electrode lead 202 may be interposed between the upper pouch sheet 221 and the lower pouch sheet 222, and respective one ends of the positive electrode lead 201 and the negative electrode lead 202 may be exposed and thus may function as electrode terminals.

In order to insert the sensing part 110 of the flexible printed circuit board 100 into the pouch cell 200 and prevent leakage of the internal pressure of the pouch cell 200, a portion of the extension part 120 is interposed between the upper pouch sheet 221 and the lower pouch sheet 222, and, in this state, the pouch outer casing 220 is sealed.

In this case, in order to prevent damage due to applied heat and pressure and strengthen adhesion with the internal adhesive layers of the pouch outer casing 220, the extension part 120 of the flexible printed circuit board 100 according to the present disclosure includes a protective sheath 121 in a predetermined section. The predetermined section refers to a section of the extension part 120 that is to be interposed in the sealing portion 240 of the pouch cell 200.

As shown in FIG. 4, the protective layer 121 may extend with a length equal to or longer than a width of the sealing portion 240 formed in the pouch cell 200.

Figure 6:
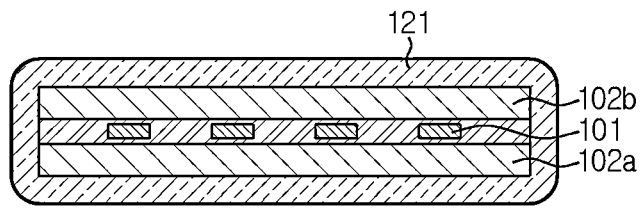
FIG. 6 is a schematic cross-sectional view taken along line A-A' of FIG. 2.

Referring to FIG. 6, the protective sheath 121 may be formed of a metal such as gold (Au) or copper (Cu), and may be provided in the form of enclosing the outer surface of the insulating film 102 of the predetermined section. In general, although the insulating film 102 made of polyimide has excellent heat resistance, the insulating film 102 may be easily cut or cracks may easily occur in the conductor lines 101 due to simultaneous application of heat and pressure when the pouch outer casing 220 is heat-welded. However, in the present disclosure, the protective sheath 121 formed of a metal-based material surrounds the insulating film 102 to thereby protect the insulating film 102 and the conductor lines 101 from heat and pressure during thermal welding. In addition, the protective sheath 121 formed of a metal-based material and the inner adhesive layers of pouch sheets may strongly adhere each other, leading to an improvement in the sealing property of the corresponding portion.

Referring back to FIGS. 2 through 4, the board part 130 is a portion disposed outside the pouch cell 200 and includes connector pins 132 connectable to an external device. The connector pins 132 may be connected to the conductor lines 101, respectively, by soldering 131. The board part 130 may be formed to have a larger width than the sensing part 110 or the extension part 120, and the conductor lines 101 may be expanded to have large widths in the board part 130. Each connector pin 132 may be soldered (indicated by reference numeral 131) to each of the expanded conductor lines 101.

A support 133 having a rod shape may be provided at an end of the board part 130, and the connector pins 132 may each extend straight through the support 133, maintain a certain distance from each other, and be connected to an arm connector of an external device.

A method of measuring the internal pressure of the pouch cell 200 by using the flexible printed circuit board 100 for the pouch cell 200's inner pressure measurement having the above-described structure, according to the present disclosure, will now be described.

The method of measuring the internal pressure of the pouch cell 200 includes a pressure sensor installation step and an internal pressure measurement step.

As shown in FIG. 4, inside the pouch cell 200, the gas pocket portion 230 is present between an area where the electrode assembly 210 is located and the sealing portion 240 where the pouch outer casing 220 is heat-welded. The sensing part 110 of the flexible printed circuit board 100 is disposed in the gas pocket portion 230.

For example, when the electrode assembly 210 is disposed in the pouch outer casing 220 during the manufacture of the pouch cell 200, the sensing part 110 may be disposed in a place corresponding to the gas pocket portion 230, and an electrolyte injection/wetting process and a process of sealing the pouch outer casing 220 may be performed, and thus the pouch cell 200 to which the flexible printed circuit board 100 has been attached may be manufactured.

Alternatively, after the pouch cell 200 is manufactured, the flexible printed circuit board 100 may be inserted into the pouch cell 200. In this case, a pouch cell 200 having a unsealed section is manufactured so that the sensing part 110 may be easily inserted into the pouch cell 200. The unsealed section refers to a section left without being sealed such that the sensing unit 110 may be inserted, when the pouch outer casing 220 is sealed by heat-welding the respective edges of the upper pouch sheet 221 and the lower pouch sheet 222. After the sensing part 110 of the flexible printed circuit board 100 is pushed into the pouch cell 200 through the unsealed section, the pouch outer casing 220 is sealed by heat-welding the unsealed section. At this time, the protective sheath 121 of the extension part 120 is heat-welded between the upper pouch sheet 221 and the lower pouch sheet 222.

In particular, the unsealed section is heat-welded using a heat-pressing jig 30 having a groove 31 corresponding to the shape of the protective sheath 121 of the extension part 120. A portion of the pouch outer casing 220 in which the protective sheath 121 of the extension part 120 is interposed may have a low bonding strength compared to other sealing areas of the pouch outer casing 220 due to the thickness of the extension part 120 including the protective sheath 121. This may be due to a lifting phenomenon caused by the inability to properly apply heat and pressure to both corners of the protective sheath 121 and to between the upper pouch sheet 221 and the lower pouch sheet 222.

Figure 7:
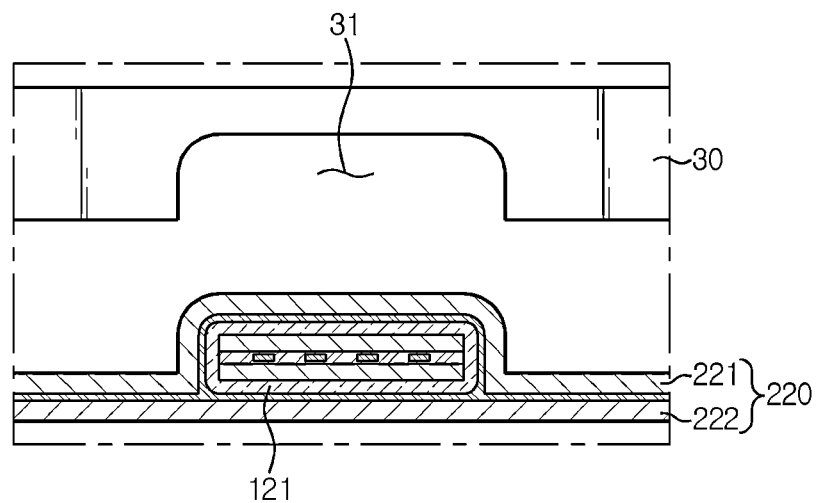
FIG. 7 is a schematic diagram of a sealing portion of a pouch outer casing in which a protective sheath of the flexible printed circuit board according to an embodiment of the present disclosure has been interposed.
Figure 8:
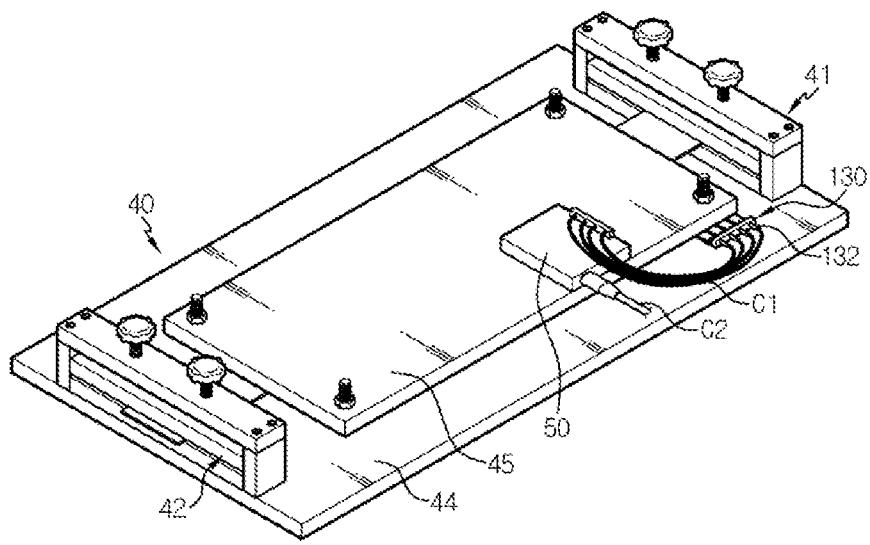
FIG. 8 is a reference diagram for explaining a method of measuring the internal pressure of a pouch cell, according to another embodiment of the present disclosure.

In the present embodiment, to prevent the lifting phenomenon, as shown in FIG. 7, the upper pouch sheet 221 is pressed from the top by using the heat-pressing jig 30 including the groove 31, and at the same time the lower pouch sheet 222 is pressed from the bottom by using a flat heat-pressing jig (not shown), to thereby integrally heat-welding the upper pouch sheet 221, the protective sheath 121 of the extension part 120, and the lower pouch sheet 222. In this case, upper, lower, left, and right sides of the protective sheath 121 are closely adhered to the upper pouch sheet 221 and the lower pouch sheet 222, and thus the sealing properties of the pouch outer casing 220 and the fixing properties of the flexible printed circuit board 100 may be improved As described above, when the pouch cell 200 in which the flexible printed circuit board 100 has been installed is prepared, the internal pressure of the pouch cell 200 is measured while repeating charging and discharging of the pouch cell 200. The pouch cell 200 may be charged/discharged by using, for example, a charging/discharging jig 40 as shown in FIG. 8.

The charging/discharging jig 40 may include voltage grippers 41 and 42, a base plate 44, and a pressurization plate 45. The pouch cell 200 is placed on the base plate 44 of a surface plate, and the pressurization plate 45 is disposed on the pouch cell 200. In order to provide a certain pressure to the pouch cell 200 during charging and discharging, the base plate 44 and the pressurization plate 45 may be provided with bolts and nuts at their corners and configured to be able to adjust a vertical spacing.

The positive electrode lead 201 and the negative electrode lead 202 of the pouch cell 200 may be respectively engaged with the voltage grippers 41 and 42, and a charging/discharging supply source (not shown) for supplying a voltage/current may be connected to the voltage grippers 41 and 42, thereby charging and discharging the pouch cell.

The board part 130 of the flexible printed circuit board 100 may be connected to a control device 50 through a cable connector C1, and the control device 50 may be connected to a display device (not shown) displaying a value from the pressure sensor 111 through another cable C2.

According to such a configuration, a change in the internal pressure of the pouch cell 200 is monitored while charging and discharging of the pouch cell 200 is being repeated. When gas is generated inside the pouch cell 200 during charging and discharging, the gas is collected in the gas pocket portion 230 and the pressure of the gas is measured by the pressure sensor 111. The value of the measured gas pressure may be displayed on the display device in real time. Also, a change in the temperature inside the pouch cell 200 may be monitored by the temperature sensor 112, along with the change in the internal pressure of the pouch cell 200.

As such, when the flexible printed circuit board 100 for measuring the internal pressure of the pouch cell 200 is inserted into the gas pocket portion 230 of the pouch cell 200 and the pouch cell 200 is sealed, even when the pressure sensor 111 is inserted into the pouch cell 200, the pressure sensor 111 may directly measure the internal pressure of the pouch cell 200 without functional problems.

Figure 9:
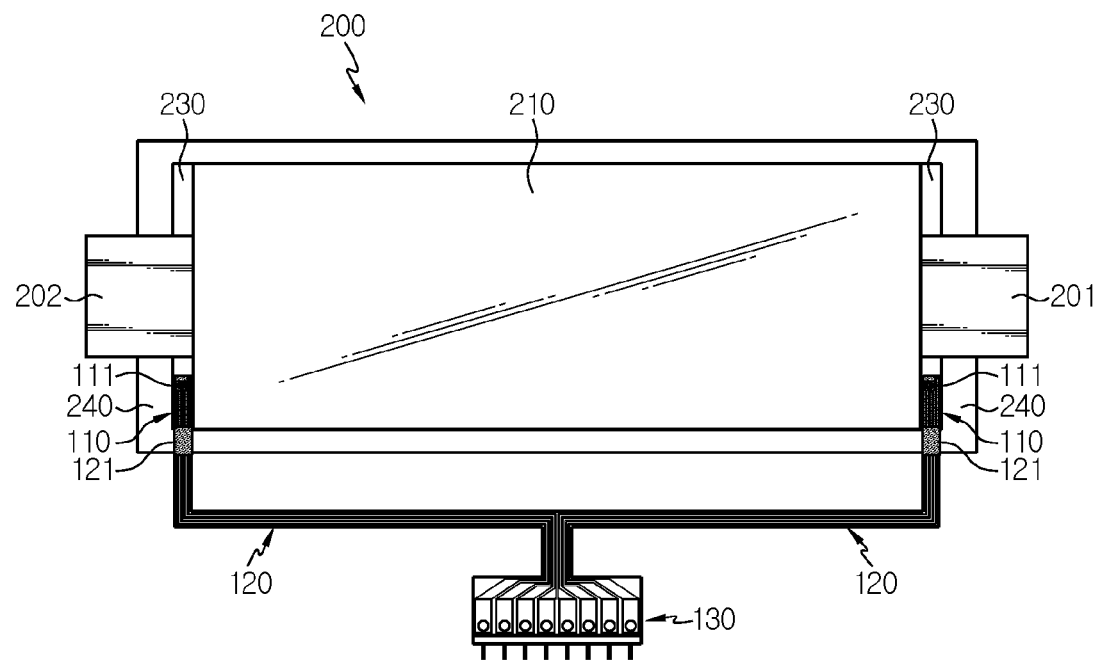
FIG. 9 is a reference diagram for explaining a method of measuring the internal pressure of a pouch cell by using a flexible printed circuit according to another embodiment of the present disclosure.

FIG. 9 is a reference diagram for explaining a method of measuring the internal pressure of a pouch cell by using a flexible printed circuit according to another embodiment of the present disclosure.

A flexible printed circuit board 100 for measuring the internal pressure of a pouch cell 200, according to another embodiment of the present disclosure, and a method of measuring the internal pressure of the pouch cell 200 by using the flexible printed circuit board 100 will be described with reference to FIG. 9.

Reference numerals of FIG. 9 that are the same as those in the above-described embodiment denote the same members, and repeated descriptions of the same members will be omitted. Differences from the above-described embodiments will be mainly described.

The flexible printed circuit board 100 for measuring the internal pressure of the pouch cell 200, according to the present embodiment, may include two sensing parts 110 and one board part 130. The extension part 120 may be configured to extend from each sensing part 110 and be merged with each sensing part 110 in the board part 130. One pressure sensor 111 may be mounted on each of the two sensing parts 110, and the board part 130 may include a plurality of connector pins 132 necessary for signal transmission from the two sensing parts 110.

When the flexible printed circuit board 100 for measuring the internal pressure of the pouch cell 200 is used, one sensing part 110 may be disposed in a gas pocket portion 230 on a side of the pouch cell 200 where the positive electrode lead 201 is located, and another sensing part 110 may be disposed in a gas pocket portion 230 on a side of the pouch cell 200 where the negative electrode lead 202 is located. In this case, a pressure distribution of each region within the pouch cell 200 may be measured.

According to the present embodiment, the flexible printed circuit board 100 for measuring the internal pressure of the pouch cell 200 may be manufactured to have two or three sensing parts 110 or more than three sensing parts 110, and the pressure sensor 111 may be disposed at several places within the pouch cell 200.

The present disclosure has been described in detail. However, it should be understood that the detailed description and specific examples, while indicating preferred embodiments of the present disclosure, are given by way of illustration only, since various changes and modifications within the scope of the present disclosure will become apparent to those skilled in the art from this detailed description.

Meanwhile, when terms indicating directions such as up, down, left, right, front, and rear are used in the present specification, these terms indicate relative locations and are only for convenience of description, and it is apparent to those skilled in the art that these terms may vary depending on a position of a target object or a position of an observer.

What is claimed is:

1. A flexible printed circuit board for pouch cell internal pressure measurement comprising:
    a plurality of conductor lines;
    an insulating film having insulation properties and flexibility, which surrounds the plurality of conductor lines;
    a sensing part on which a pressure sensor is mounted;
    a board part having connector pins connected to the plurality of conductor lines, respectively; and
    an extension part extending from the sensing part to the board part,
    wherein the extension part comprises a protective sheath of a metal material that surrounds an outer surface of the insulating film in a predetermined section.

2. The flexible printed circuit board of claim 1, wherein the protective sheath is a gold or copper.

3. The flexible printed circuit board of claim 1, wherein the sensing part has a width equal to or smaller than a width of a gas pocket portion formed in a pouch cell that is an internal pressure measurement target, and
    the protective sheath is formed to extend with a length equal to or greater than a width of a sealing portion formed in the pouch cell.

4. The flexible printed circuit board of claim 1, wherein the sensing part is parylene coated.

5. The flexible printed circuit board of claim 4, wherein an underfill or a conformal coating is added to a portion of the sensing part where the pressure sensor and the plurality of conductor lines are soldered.

6. The flexible printed circuit board of claim 1, wherein the pressure sensor is a waterproof micro electro-mechanical system (MEMS) pressure sensor.

7. The flexible printed circuit board of claim 1, wherein the sensing part further comprises a temperature sensor.

8. The flexible printed circuit board of claim 1, wherein the sensing part is provided in plurality and the board part-is provided in singularity.

9. A method of measuring internal pressure of a pouch cell using the flexible printed circuit board of claim 1, the pouch cell comprising a pouch outer casing including an upper pouch sheet and a lower pouch sheet covering the upper and lower sides of an electrode assembly, respectively, the method comprising:
    sealing the pouch outer casing by thermally welding the protective sheath together with the upper pouch sheet and the lower pouch sheet when the sensing part is disposed in a gas pocket portion inside the pouch cell; and
    measuring the internal pressure of the pouch cell by connecting a data analysis device to the board part of the flexible printed circuit board and measuring the internal pressure of the pouch cell while repeatedly charging and discharging the pouch cell.

10. The method of claim 9, wherein, before disposing the at least one sensing part in the gas pocket portion, a further step of partially sealing the pouch cell by heat-sealing the edges of the upper pouch sheet and the lower pouch sheet to and leaving an unsealed section so that the at least one sensing part can be inserted.

11. The method of claim 10, further comprising integrally heat welding the upper pouch sheet, the protective sheath, and the lower pouch sheet with one another using a heat-pressing jig having a groove corresponding to a shape of the protective sheath of an extension part when heat-welding the unsealed section.

12. The method of claim 9, wherein the at least one sensing part includes a first sensing part and a second sensing part, and the method further comprises:
    disposing the first sensing parts in the gas pocket portion on a side of the pouch cell where a positive electrode lead is located; and
    disposing the second sensing part in the gas pocket portion on a side of the pouch cell where a negative electrode lead is located.

13. The method of claim 10, wherein, after the at least one sensing part is inserted into the pouch outer casing through the unsealed section, a further step of sealing the pouch outer casing by heat-welding the unsealed section.

* * * * *